United States Patent [19]

Johnson et al.

[11] 4,274,657
[45] Jun. 23, 1981

[54] VEHICLE PASSIVE OCCUPANT RESTRAINING SYSTEM

[75] Inventors: Richard F. Johnson, Bloomfield Hills; John W. Wiers, Washington, both of Mich.

[73] Assignee: Rockwell International Corporation, Pittsburgh, Pa.

[21] Appl. No.: 40,656

[22] Filed: May 21, 1979

[51] Int. Cl.³ .............................................. B60R 21/10
[52] U.S. Cl. .................................... 280/803; 297/469
[58] Field of Search .............. 280/804, 803, 802, 808; 297/469, 483, 468

[56] References Cited

U.S. PATENT DOCUMENTS

| | | | |
|---|---|---|---|
| 3,833,239 | 9/1974 | Coenen | 280/803 |
| 3,905,614 | 9/1975 | Linblad | 280/803 |
| 3,949,825 | 4/1976 | Kazaoka | 280/803 |
| 3,995,884 | 12/1976 | Bauer | 280/804 |
| 4,061,365 | 12/1977 | Nagano | 280/804 |

Primary Examiner—John A. Pekar

[57] ABSTRACT

An automatic seat belt restraining system which is to be used in a vehicle of the type having a passenger compartment including a seat therein. The system is made up of a three point shoulder and lap belt assembly which has first ends attached to the body of the vehicle. The second ends of the shoulder and lap belts are separately attached to a continuous cable drive assembly. The shoulder and lap belt drive cable is contained in a guide track located outboard of the seat on an inner surface of the door of the vehicle. The cable is rigid enough to be driven forward and backward in the guide track. A motor-pinion gear drive assembly drives the cable through the guide track to simultaneously move the belts to a position which either restrains the occupant or permits him to leave the vehicle. A door switch and limit switches are used to activate and deactivate the system.

7 Claims, 6 Drawing Figures

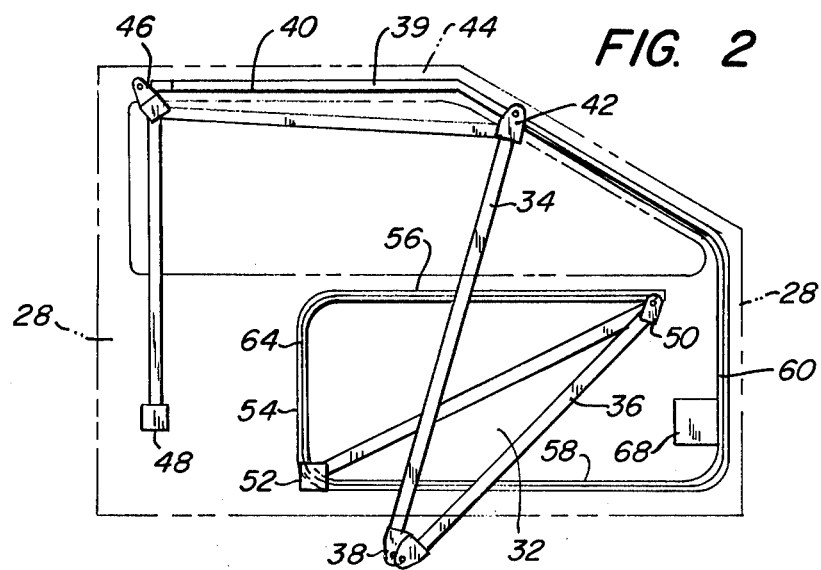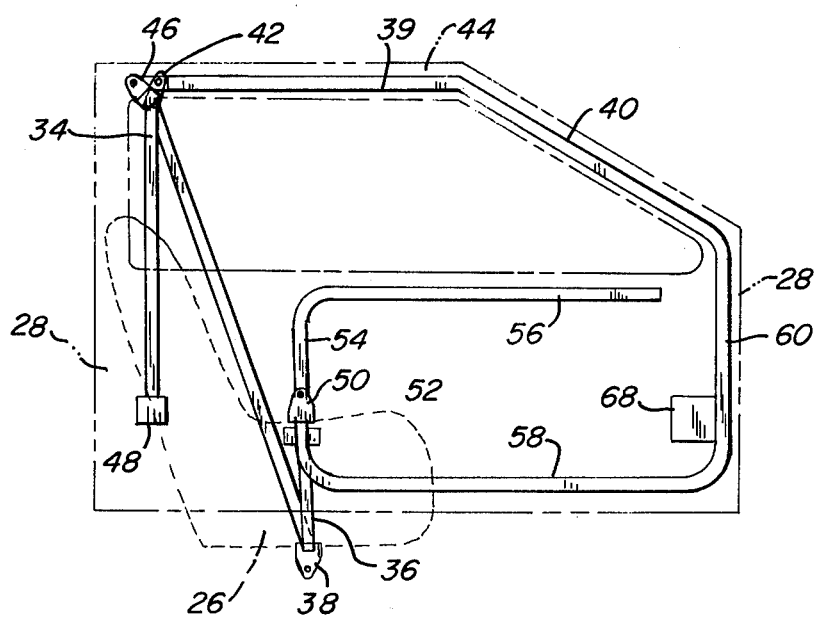

VEHICLE PASSIVE OCCUPANT RESTRAINING SYSTEM

BACKGROUND OF THE INVENTION

1. Field of the Invention.

The present invention is directed to a vehicle occupant restraining arrangement and, more specifically, to an automatic shoulder and lap belt restraining system for use in automobiles.

2. Description of the Prior Art.

In prior art automatic seat belt restraining systems separate drive systems and guide tracks were utilized. These systems are generally disclosed in U.S. Pat. No. 3,680,883 to Keppel et al. and U.S. Pat. No. 3,842,929 to Wada et al.

A disadvantage of these systems is that two separate guide tracks and two separate drive means are utilized to move the seat belts from their open to their restraining positions. This greatly complicates the installation of the restraining system in the automobile. Also, the two drive systems require a more complicated control system than is required for a passive seat belt restraint with a single drive system.

Many prior art systems require attachment of their component and drive systems to the body or roof of the automobile. The present system is entirely contained on the door of the vehicle with the exception of the attachment point of the shoulder and lap belt to the body of the vehicle inboard of the seat. Entirely installing the drive mechanisms, inertial locking retractors and guide track on the door simplifies installation and operation of the restraint system.

SUMMARY OF THE INVENTION

It is an object of this invention to provide a simple and economical seat belt restraining system for a vehicle.

It is a further object to provide a seat belt restraining system whose moving parts are mounted entirely on the door of the vehicle.

It is still a further object of this invention to provide a seat belt restraining system in which the lap and shoulder belts are positioned by one moving cable mounted on the inside of the vehicle door.

An additional object of the invention is to provide a three point seat belt system which can be automatically positioned either to allow egress from the vehicle by an occupant or restrain an occupant in the seat by means of a cable mounted in a track which is controlled by various sensing means.

It is a still further object of the invention to provide a seat belt restraining system as described above with the sensing means included in the door to sense the opening or closing of the door.

These and other objects of the invention are disclosed in a preferred embodiment of the invention which includes an automatic belt restraining system for use in a vehicle of the type having a passenger compartment. This system includes a shoulder and a lap belt with the first end of the shoulder and lap belts attached to the body of the vehicle inboard of a seat. A continuous shoulder and lap belt drive cable is fixedly attached to a second end of each of the shoulder and the lap belts. The shoulder and the lap belt drive cable is contained in a guide track located outboard of the seat on an inner surface of the passenger compartment of the vehicle. The drive cable has sufficient rigidity to be driven forward and backward in the guide track to locate the shoulder and lap belt. A means for driving the cable through the guide track from a first position in which the seat and lap belts are simultaneously moved to a position to permit egress from the vehicle and simultaneously moved to a second position in which the seat and lap belts are in a position which would restrain movement of a passenger seated in the vehicle is provided. A means for actuating the cable drive means between the first and second position and from the second and first position is also included.

These and other objects and advantages of the present invention will become apparent from the following description of the accompanying drawings.

BRIEF DESCRIPTION OF THE DRAWINGS

FIG. 2 is a view of the interior of the door of the vehicle showing the guide track, motor and inertial retractors with the belts shown in a position to allow egress from the vehicle.

FIG. 3 is a view of the interior of the door of the vehicle showing the guide track, motor and inertial retractors with the belts shown in the occupant restraining position.

DESCRIPTION OF THE INVENTION

Figure 1:
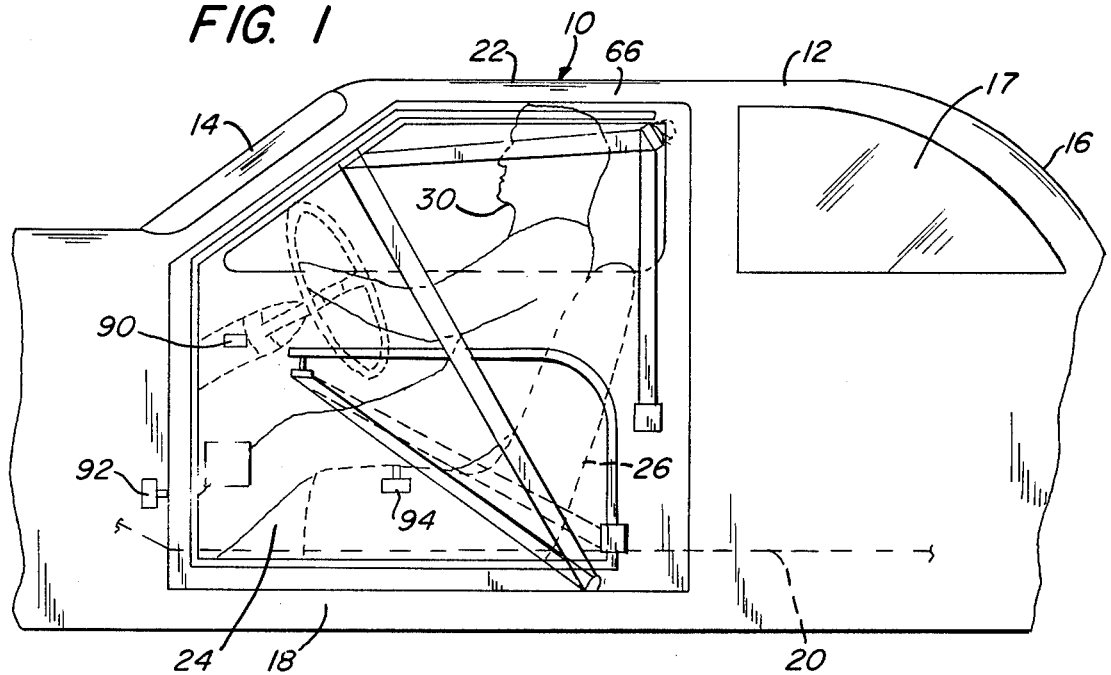
FIG. 1 is a view of the interior of a portion of a vehicle that includes the belt arrangement according to the invention with the belts shown in a position to allow egress from the vehicle.

With reference to the drawings, there is shown in FIG. 1 a vehicle generally indicated as 10 which includes a body generally denoted as 12 having the usual front windshield 14 and a rear window area 16 and side window 17. The vehicle 10 includes a floor 18 with a conventional transmission tunnel 20 and a roof 22 which cooperate to define an occupant compartment 24 in which is mounted a vehicle seat 26. Ingress and egress to and from the occupant compartment 24 is by way of a door 28 whose front edge is hinged to the vehicle body 12.

As shown in FIGS. 1 and 2, a phantom line indicates a seated occupant 30. A seat belt system 32 is so positioned to allow the occupant 30 to fully open door 28 and exit the vehicle. Belt system 32 includes a shoulder belt 34 and a lap belt 36. In the preferred embodiment both the lap belt 36 and the shoulder belt 34 have a first end fixed to the vehicle body 12 by a seat belt buckle end 38. The seat belt buckle end 38 may be attached either to the floor 18 or the transmission tunnel 20.

In the open position, as seen in FIG. 2, the shoulder belt 34 extends diagonally across the front of the vehicle from seat belt buckle end 38 to the door such that a first intermediate portion of the belt is slidably received on an upper horizontal run 39 of the guide track 40 by a slotted carrier 42. The shoulder belt 34 extends rearwardly along the door frame 44 to a shoulder belt anchor 46 which directs the shoulder belt downwardly from the shoulder belt anchor 46 and is received by a releasable automatic inertial locking retractor 48. Locking retractor 48 is of a conventional type and is mounted on the lower rear portion of door 28 in a conventional manner.

The preferred seat belt system 32 also includes lap belt 36. In the open position the lap belt 36 has a first end connected to the seat belt buckle end 38 and extends diagonally upward toward the forward portion of the door 28 in front of the seat 26. The lap belt 36 has an intermediate portion which is slidably received in the guide track 40 by a slotted carrier. The lap belt 36 then extends rearwardly and diagonally down to the lower central portion of the door 28 and is received by a releasable automatic inertial locking retractor 52. Locking retractor 52 is of a conventional type and is mounted on the lower central portion of the door 28 in a conventional manner. The carriers 42 and 50 are slotted to permit the lap and shoulder belts to slide therethrough and thus be kept taut by the inertial retractors.

As can be best seen in FIG. 3, when the preferred belt system 32 is in the restraining position the shoulder belt 34 extends diagonally across the chest of the seat occupant 30. In this position the intermediate portion of belt 34, which is carried by the carrier 42, is adjacent the shoulder belt anchor 46. The shoulder belt anchor 46 still acts to direct the belt 34 into the inertial retractor 48.

As shown in FIG. 3, lap belt 36 is in the restraining position. In this position the lap belt 36 crosses the lap of the occupant 30 and is positioned at the lowermost portion of the vertical run 54 of guide track 40. In this position the carrier 50 holds the intermediate portion of the belt so that the remainder of the belt is directed into the inertial retractor 52 mounted on door 28.

The preferred guide track 40 is in a general spiral configuration and has a horizontal portion 56 which extends toward the front of the vehicle 10. A vertical portion 54 extends downwardly from the rear of portion 56. A horizontal portion 58 extends along the bottom of the door 28 then turns upward to form a generally vertically running portion 60 which follows the contour of the front of door 28. A horizontal portion 39 then runs towards the rear of the door 28 along the portion of door frame 44 above the window 17. The preferred guide track 40 thus forms a single open loop circuit. The guide track 40 contains a helically wound elongate drive cable 64 to which carriers 42 and 50 are fixedly attached at each end. The length of cable 64 is such that when the cable is moved through track 40 from the restraining position to open and back to the restraining position the carriers 42 and 50 are moved simultaneously to always place the lap and shoulder belts in proper position for either restraining the occupant or permitting his egress from the vehicle 10.

Figure 4:
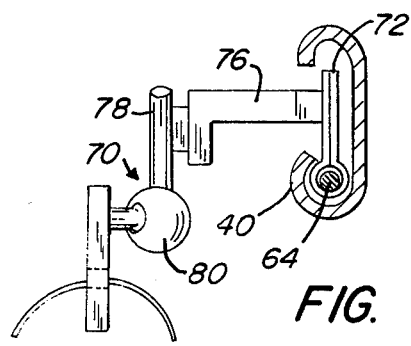
FIG. 4 is a sectional side view of the belt transporter used to carry the belts along the cable track.
Figure 5:
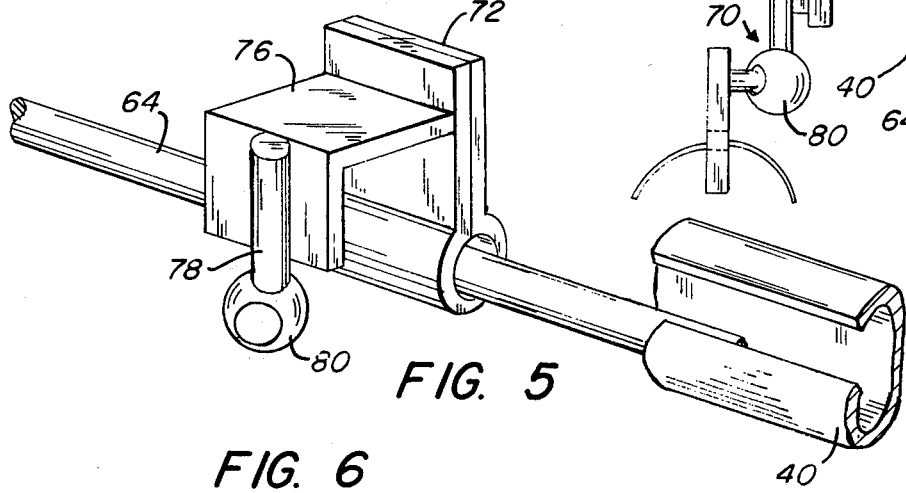
FIG. 5 is a perspective view of the transporter shown in FIG. 4.
Figure 6:
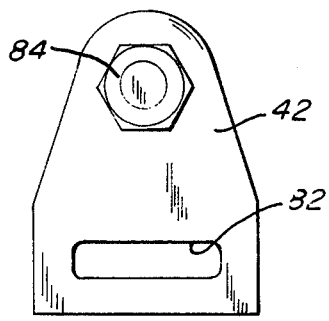
FIG. 6 is a front elevational view of the belt carrier shown in FIG. 4.

FIGS. 4, 5 and 6 show various views of the belt transporter which is denoted generally as 70. The transporter is used to move the carriers 42 and 50 along with the drive cable 64 of the restraining system. A catch 72 is wrapped around the cable 64 to be fixedly attached thereto. A bracket 76 extends inwardly of the vehicle perpendicular to the guide track 40 and supports a carrier attachment bracket 78 to the catch 72. The bracket 78 has a socket end 80 which is capable of receiving a ball welded on carriers 42 and 50 so that the carrier may be snapped into engagement with the transporter 70 when the belts are installed in the vehicle. As can best be seen in FIG. 6, the carriers 42 or 50 have a slot 82 at their lower end so that the belt may be looped through and transported therein during operation of the restraining system. The carriers 42 and 50 also have a circular extension 84 which mates with the hole in the sphere 80. This transport system allows the carrier 42 or 50 to be fixed to the drive cable for movement therewith and permit supporting a portion of the shoulder or lap belt intermediate their anchored ends for movement with the carrier and the cable while permitting the shoulder or lap belt to transverse the slot 82 in carrier 42 or 50. The movement of the belt through the slot 82 during operation insures proper positioning of the belt for passenger entry into or egress from the vehicle.

It should be noted that in a vehicle without a frame around window 17 the cable 64 may be routed through the inside of door 28 after leaving portion 58 of the guide track and out the front of door 28 adjacent the hinge and into the body 12 and be inserted in a guide track similar to the upper part of portion 60 of the present guide track. The portion 39 of the guide track would continue horizontally towards the rear but would be mounted on the roof rail 66 of a vehicle of this type instead of on the portion 44 of door 28. This scheme would allow a single cable 64 to move carriers 42 and 50 while carriers 42 and 50 ride in non-continuous guide tracks. As indicated above, these guide tracks would be similar in configuration and layout to guide track 40 except that portion 60 would terminate part way up the front of door 28 and would be replaced by a guide tube (not shown) in the door and in the body of the vehicle 10. This guide tube would have a flexible portion to bridge the gap between the door 28 and the body 12 when the door 28 is opened and closed.

A conventional drive mechanism 68, such as that disclosed in U.S. Pat. Nos. 3,163,054; 3,675,371; 3,681,874 and 3,842,929, is mounted inside or on the door in a suitable manner. The drive mechanism 68 drives cable 64 and thereby carriers 42 and 50 from their open position to their restraining position and back again. During this movement, the bias of the locking retractors 48 and 52 maintain the belts in a taut condition as the belts slide through the slots 82 in the carriers 42 and 50. Thus, the drive mechanism 68 and cable guide track combination allows the movement of the belt restraining system between the FIG. 2 easy enter position and the FIG. 3 restraining position. In the preferred embodiment limit switches (not shown) are provided at each end of guide track 40 to sense the presence of cable 64 at the end of the track. Upon sensing the cable 64 at either end of track 40, the limit switches deactivate the drive mechanism 68.

While in the preferred embodiment the drive mechanism 68 drives the carriers 42 and 50 from the open to the restraining position and back to the open position again some embodiments of the invention may be designed to allow moving of the carriers 42 and 50 from the restraining to open position manually. In this embodiment the drive mechanism 68 would be allowed to slip when not activated.

The operation of a vehicle including a belt system 32 is as follows: the occupant enters the vehicle 10 through the vehicle body door 28 with the shoulder belt 34 and the lap belt 36 as shown in FIG. 2 in a generally V-shaped entering position which is due to the positioning of carriers 42 and 50 at the front of guide track portion 62 and 56 respectively. When the occupant has assumed a seating position, the occupant's right arm will be positioned inboard of the shoulder belt 34 while the left arm will be positioned outboard of the shoulder belt. Since the carriers 42 and 50 are located closer to the seat belt buckle end 38 in the door closed position than in the door open position, closing movement of the door 28 will cause retractors 48 and 52 to retract the shoulder and lap belts 34 and 36 to maintain a taut belt condition. When occupant 30 places the vehicle 10 in an operative condition, the drive mechanism 68 is actuated to drive cable 64 in a generally counterclockwise direction to simultaneously move the carriers 42 and 50 from the FIG. 2 position which placed the belt towards the front of the vehicle 10 to the FIG. 3 position which places the belt in the restraining position. During this movement the retractors 48 and 52 retract the respective belts 34 and 36 to maintain the belts in a taut condition when the carriers reach the rear of portion 62 and the correct vertical position on portion 54 of the guide track 40. The belts 34 and 36 are positioned in the occupant restraining position of FIG. 3 without any effort on the part of the occupant 30.

It should be pointed out that there are many possibilities for the operative condition of the vehicle 10 which causes the movement of carriers 42 and 50 and consequent movement of the belts 34 and 36 to the occupant restraining position. Ignition of the vehicle 10 via switch 90 is one of the possibilities for the operative condition. Similarly, it is also possible for the operative condition to be the ignition of the vehicle 10 and subsequent placing of the vehicle in one of the selected drive positions or ignition with the vehicle door shut. It is also possible to cause the movement of the belts 34 and 36 to the occupant restraining position by a switch 92 which senses movement of the door 28 such that whenever an occupant is in a seated position with the door closed, the occupant will be restrained by the belt arrangement 32, while forward movement is allowed at a controlled rate in a special manner by the inertial retractors 48 and 52. A weight sensing switch 94 would be used to sense when the passenger is seated. The activation means may be contained in the door and door handle. In this embodiment the system would move to the restraining position when the door is closed and then to the open position by a switch when the door is either opened or when the opening mechanism is moved by the door handle.

Upon cessation of the operative condition of vehicle 10, a means is provided to release the locking retractors 48 and 52. This means may be the solenoid which is described in U.S. Pat. No. 3,680,883 with a suitable control circuit which is designed to release the locking retractors so that the shoulder and lap belts 34 and 36 respectively may be quickly moved to the open position. With the locking retractors released, the drive mechanism 68 is actuated in a clockwise direction to move carriers 42 and 50 from their above described restraining positions to the forward positions on guide track portions 60 and 56 respectively. This position is as shown in FIG. 2 and permits easy entry and exit of the occupant 30 from the vehicle 10. The release means for the locking retractors 48 and 52 also permits quick opening of the door 28. Without this feature it has been found that the inertial retractors will lock upon quick acceleration of the door when the vehicle occupant is trying to exit from the vehicle.

In order to provide quieter operation, the cable 64 may be flocked as taught in United States Patent 3,389,579.

The invention described thus provides an improved vehicle belt restraining system for restraining a seated occupant in response to an operative condition of a vehicle and requiring no effort on the part of the occupant.

We claim:

1. An automatic belt restraining system for use in a motor vehicle of the type having a passenger seat in a compartment which includes a door having a metal frame around a window opening therein, said system comprising:
   a shoulder belt anchored at one end to said vehicle inboard of said seat and anchored at the other end to said door;
   a lap belt anchored at one end to said vehicle inboard of said seat and anchored at the other end to said door;
   a drive assembly including a guide track located on said door, said guide track bent around said door with bends having an included angle of 90 degrees or greater, said guide track having a horizontal first end section and a vertical second section and a drive cable having sufficient rigidity to be driven in either direction along said guide track;
   a first carrier fixed to said drive cable for movement therewith and including means supporting a portion of said shoulder belt intermediate its anchored ends for movement with said carrier and said cable to said first end section of said guide track while permitting said shoulder belt to traverse said carrier;
   a second carrier fixed to said drive cable at a location remote from said first carrier and including means supporting a portion of said lap belt intermediate its anchored ends for movement with said second carrier and said cable to said second section of said guide track while permitting said lap belt to traverse said carrier;
   drive means for driving said cable along said guide track and moving said carriers from a first position in which said shoulder belt and said lap belt are remote from said seat to permit access to and from said vehicle to said first and said second sections of said guide track in which said shoulder belt and lap belt would restrain abrupt forward movement of a passenger seated in said vehicle section; and
   means for activating said drive means to simultaneously move said shoulder belt and said lap belt from said first position to said second position and from said second position to said first position.

2. The drive mechanism defined by claim 1 wherein said guide track is a conduit and said drive cable is a helically wound wire cable movable in said conduit.

3. The seat belt restraining system of claim 1 wherein said means for activating said cable drive system is a weight sensing switch located in the seat of said vehicle in conjunction with a switch which senses door opening and closing.

4. The seat belt restraining system of claim 1 wherein said means for activating said cable drive means is coupled to the ignition switch of said vehicle in conjunction with a switch which senses door opening and closing.

5. The seat belt restraining system of claim 1 wherein said means for activating said cable drive means is a switch which senses door opening and closing.

6. An automatic belt restraint system for use in a motor vehicle of the type having a passenger compartment which includes doors having a metal frame around a window opening therein, said vehicle doors having a forward edge connected to the vehicle body by a hinged connection, said belt restraining system comprising:

a shoulder and a lap belt for restraining an occupant in said vehicle;

a first end of said shoulder and lap belts attached to the body of said vehicle inboard of a seat;

a shoulder and lap belt drive assembly located on said door of said vehicle;

said drive assembly including a single loop guide track having a horizontal section set along the upper portion of the metal frame of said door above said window for positioning said shoulder belt, the forward edge of said door, the lower portion of said door along a central area of said door then vertically upward at a point located to correctly position said lap belt and a final horizontal portion running under said window towards said forward edge of said door, said guide track having bends therein with an included angle of 90 degrees or greater;

said guide assembly includes a helically wire wound drive cable having sufficient rigidity to be driven forward and backward in said guide track;

means for attaching a second end of each of said shoulder and lap belts to said drive cable for movement therewith;

a motor capable of driving a gear which in turn drives said guide cable, said motor and said gear located within said door of said vehicle; and a switch mounted on said forward edge of said door of said vehicle for sensing the entering or leaving of said occupant, said switch actuating said cable drive to release said restraining belts when said occupant desires to exit said vehicle and engage said system when said occupant closes said door of said vehicle.

7. An automatic belt restraint system as set forth in claim 6, wherein said second end of said shoulder and lap belts is positioned along said horizontal portion of said upper portion of said guide track and said vertically upward portion in said central area respectively when said shoulder and lap belts are in an occupant restraining system.

* * * * *